UNITED STATES PATENT OFFICE.

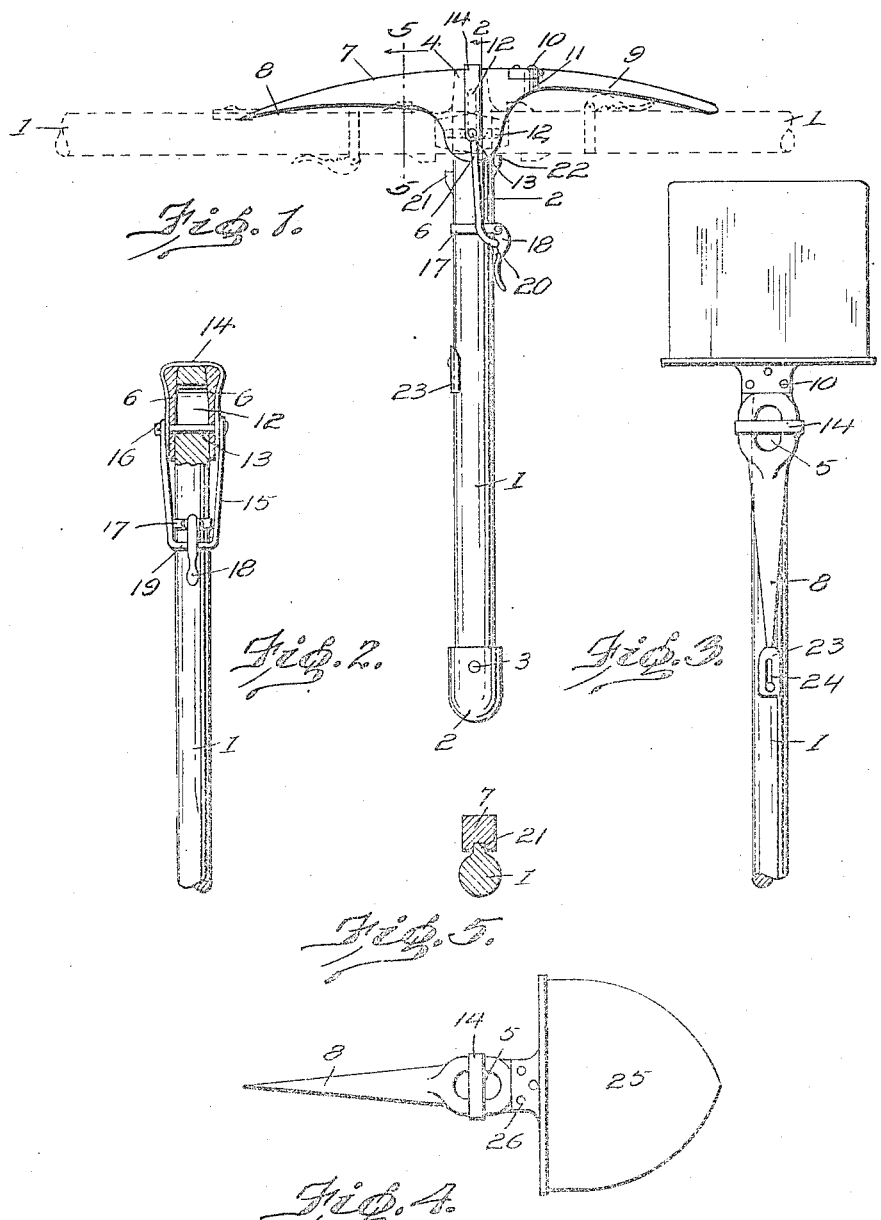

JAMES WOOD PEARSON, OF NEAR ELK GROVE, CALIFORNIA.

COMBINATION-TOOL.

1,377,920.         Specification of Letters Patent.    Patented May 10, 1921.

Application filed October 27, 1920. Serial No. 419,872.

*To all whom it may concern:*

Be it known that I, JAMES WOOD PEARSON, a citizen of the United States, residing near Elk Grove, in the county of Sacramento and State of California, have invented certain new and useful Improvements in Combination-Tools, of which the following is a specification.

This invention relates to a combination tool and more particularly to that type of tools comprising a double ended implement in the form of a pick and shovel, pick and spade or pick and hoe.

The primary object of my invention therefore is the provision of an implement of the above class which may be readily converted from one form to another quickly and expeditiously to meet the desired need.

Another object of the invention relates to a combination tool including means to lock the implement in its operative position and means on the handle for locking one end of the blade thereto.

With these objects in view and others which will be manifest and suggested as the nature and purpose of my invention are revealed in the following specification and drawing wherein I have shown a practical, yet preferred embodiment thereof.

Figure 1 is a perspective view of the device.

Fig. 2 is a section taken on the line 2—2 of Fig. 1.

Fig. 3 is a view showing the implement when used as a shovel.

Fig. 4 is a top view of Fig. 1.

Fig. 5 is a section taken on the line 5—5 of Fig. 1.

In the drawings wherein similar reference characters refer to corresponding parts in the specification, numeral 1 designates a handle member which may be constructed of wood, metal or other suitable material and provided at its lower extremity with a removable pestle 2 secured thereto by a short screw 3. The upper terminal 4 of the handle is somewhat reduced in thickness and is received within the socket 5 formed by the curved attaching ears 6 of the implement 7. A pointed member 8 in the form of a pick is formed integral with the attaching ears, and a hoe 9 riveted as at 10 to the extension 11 comprises the earth working members.

An elongated longitudinal slot 12 formed in the reduced portion of the handle receives a transverse bolt 13 which passes through alined apertures formed in the attaching ears 6, the said bolt constituting a pivotal connection between the handle and the implement blade. A U-shaped metallic strap 14 overlying the socket 5 of the implement and embracing the ears 6 is connected to the transverse bolt 13. A U-shaped locking clevis 15 also connected to the transverse bolt 13 and held thereon by the nut 16 is adapted to lock the metallic strap and implement blade in position through the movable ring 17 and the pivoted lever 18 which receives the transverse portion 19 of the clevis in the respective notches 20. Shoulder stops 21, 22 formed on each side of the handle 1 act as abutments for the ears when either end of the implement is to be used and a sliding catch 23 formed with a slot 24 therein is also secured to the handle 1 and adapted to engage the end portion of the pick 8 when in its inoperative position as clearly shown in Fig. 3. In Fig. 4 wherein I have shown a similar implement the blade 25 is in the form of a shovel and as above pointed out, is also riveted or otherwise secured as at 26 to the extension 8.

It will now be seen that since the handle is pivoted to the blade proper, it may be turned to either of the dotted line positions shown in Fig. 1 depending on whether it is desired to use the pick or the shovel. Since the locking clevis is secured to the transverse bolt, it will be obvious that it will tightly clamp the metallic strap over the top of the implement blade and the side ears and be held in immovable position by the adjustable ring and its pivoted locking lever as clearly shown in detail in Fig. 1.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

1. In a combination tool of the class described, a double ended implement blade, attaching ears formed with said blade, a handle pivoted to said attaching ears, a strap embracing said attaching ears and means connecting the said strap and locking the same to the handle.

2. In a combination tool of the class described, a double ended implement blade, attaching ears formed integral with said blade, a handle provided with a longitudinal slot in its upper terminal and pivotally connected to said ears, a transverse bolt passing through said ears and handle, a U-shaped metallic strap embracing said ears and connected to said transverse bolt, and means for locking said strap.

3. In a combination tool of the class described, a double ended implement blade, attaching ears formed with said blade, a handle retained in the socket formed by said ears, said handle being provided with an elongated, longitudinal slot in its upper terminal, a transverse bolt passing through said slot and alined apertures in said attaching ears, a metallic strap embracing said attaching ears and connected to said transverse bolt, and means for locking said metallic strap and said implement blade to the handle.

4. In a combination tool of the class described, a double ended implement blade, curved attaching ears formed integral with said blade, a handle retained in the socket formed by said ears, abutments on said handle for preventing movement of said blade in its operative position, said handle being also provided with an elongated, longitudinal slot in its upper terminal, a transverse bolt extending through said slot and alined apertures in said attaching ears, a U-shaped metallic strap embracing said ears and connected to the transverse bolt, a U-shaped locking clevis connected to said transverse bolt, and an adjustable locking lever on said handle for locking the said clevis and said strap.

In testimony whereof, I affix my signature hereto.

JAMES WOOD PEARSON.